(12) United States Patent
Testa et al.

(10) Patent No.: US 11,155,410 B2
(45) Date of Patent: Oct. 26, 2021

(54) AUTOMATIC LOCKER DEVICE WITH AT LEAST ONE BUFFER ZONE FOR THE LOADING/RECOVERY OF LOADS AND CORRESPONDING METHOD FOR HANDLING LOADS

(71) Applicant: SAVOYE, Dijon (FR)

(72) Inventors: Dominique Testa, Saint Priest en Jarez (FR); Anne Boudalier, Lille (FR)

(73) Assignee: SAVOYE, Dijon (FR)

( * ) Notice: Subject to any disclaimer, the term of this patent is extended or adjusted under 35 U.S.C. 154(b) by 130 days.

(21) Appl. No.: 16/196,694

(22) Filed: Nov. 20, 2018

(65) Prior Publication Data

US 2019/0152702 A1 May 23, 2019

(30) Foreign Application Priority Data

Nov. 23, 2017 (FR) ..................................... 1761085

(51) Int. Cl.
| | |
|---|---|
| *B65G 1/10* | (2006.01) |
| *B65G 1/137* | (2006.01) |
| *G07C 9/00* | (2020.01) |
| *B65G 1/14* | (2006.01) |
| *G07F 11/16* | (2006.01) |
| *G07F 17/12* | (2006.01) |

(52) U.S. Cl.
CPC ............ *B65G 1/10* (2013.01); *B65G 1/1373* (2013.01); *B65G 1/14* (2013.01); *G07C 9/00912* (2013.01); *G07F 11/165* (2013.01); *G07F 17/12* (2013.01)

(58) Field of Classification Search
CPC ....................................................... B65G 1/10
See application file for complete search history.

(56) References Cited

U.S. PATENT DOCUMENTS

| 9,465,390 B2* | 10/2016 | Mason | ................. B65G 1/1373 |
| 10,114,996 B2* | 10/2018 | Lossov | ............... G07F 17/0014 |
| 10,647,508 B2* | 5/2020 | Eck | ........................ B65G 1/137 |

(Continued)

FOREIGN PATENT DOCUMENTS

| CN | 106023468 A | 10/2016 |
| CN | 205866489 U | 1/2017 |

(Continued)

OTHER PUBLICATIONS

French Search Report and Written Opinion dated Jun. 7, 2018 for corresponding French Application No. 1761085, filed Nov. 23, 2017.

(Continued)

*Primary Examiner* — Mark C Hageman
(74) *Attorney, Agent, or Firm* — David D. Brush; Westman, Champlin & Koehler, P.A.

(57) ABSTRACT

An automatic locker device is configured for handling loads with operations of loading and retrieval. The device includes at least one storage zone for storing loads, at least one retrieval point and a handling mechanism, which is configured to move the loads from the at least one storage zone to the at least one retrieval point, for the retrieval operations. The automatic locker device also includes at least one buffer zone, distinct from the at least one storage zone. The handling mechanism is configured to move the loads from the at least one buffer zone to the at least one storage zone, for the loading operations.

9 Claims, 9 Drawing Sheets

(56) References Cited

U.S. PATENT DOCUMENTS

| | | | |
|---|---|---|---|
| 2008/0279669 A1 | 11/2008 | Hanel | |
| 2010/0307989 A1 | 12/2010 | Hanel | |
| 2013/0223961 A1 | 8/2013 | Hanel | |
| 2016/0321600 A1 | 11/2016 | Abutbul | |
| 2017/0036859 A1* | 2/2017 | Lopes Ribeiro | B65G 1/0407 |
| 2019/0009906 A1* | 1/2019 | von Gostomski | B64D 1/10 |
| 2020/0342392 A1* | 10/2020 | Godwin | B65G 1/0407 |

FOREIGN PATENT DOCUMENTS

| | | |
|---|---|---|
| CN | 107032035 A | 8/2017 |
| EP | 2881905 A1 | 6/2015 |
| JP | 2000016530 A | 1/2000 |
| JP | 2000344303 A | 12/2000 |
| JP | 2016088099 A | 5/2016 |
| JP | 2017109835 A | 6/2017 |

OTHER PUBLICATIONS

English translation of the French Written Opinion dated Jun. 7, 2018 for corresponding French Application No. 1761085, filed Nov. 23, 2017.
English translation of the Chinese Office Action dated Mar. 10, 2021, for corresponding Chinese Application No. 201811407347.2.
English translation of the Japanese Office Action dated Apr. 26, 2021, for parallel Japanese Application No. 2018-218898.

* cited by examiner

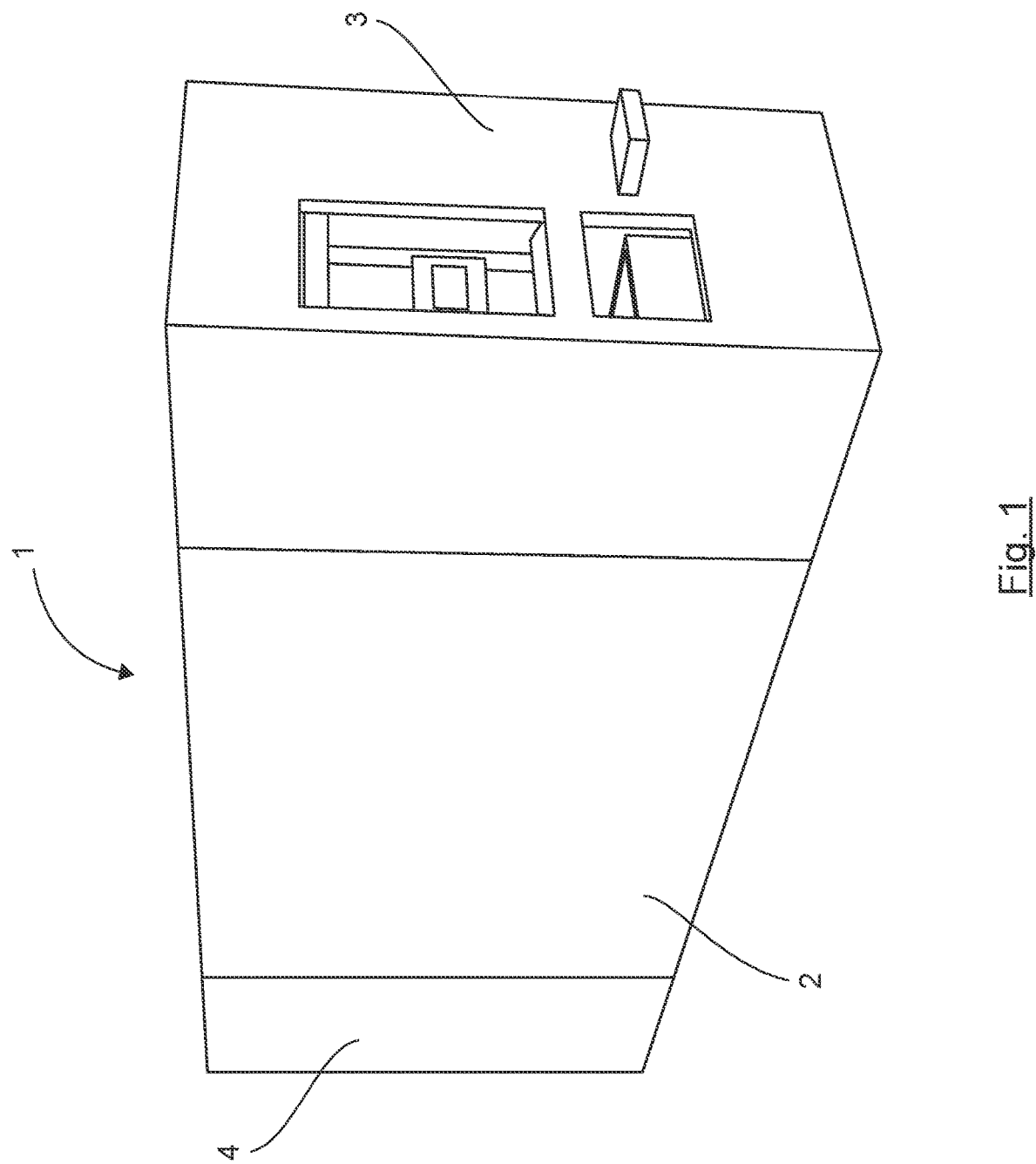

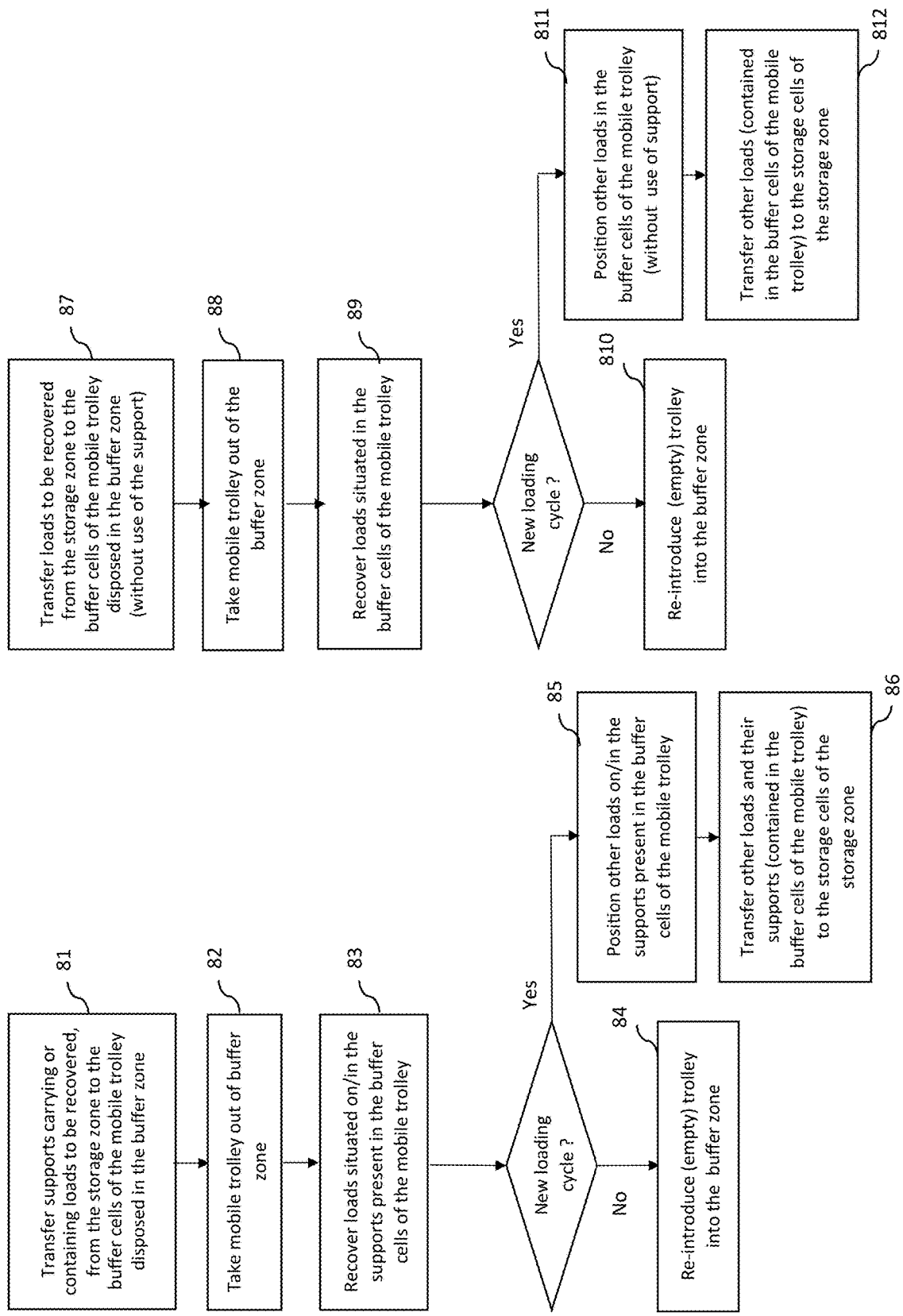

AUTOMATIC LOCKER DEVICE WITH AT LEAST ONE BUFFER ZONE FOR THE LOADING/RECOVERY OF LOADS AND CORRESPONDING METHOD FOR HANDLING LOADS

1. TECHNICAL FIELD

The invention relates to an automatic locker device (also called an automatic locker, an automatic parcel distributor, or a parcel locker) configured to handle loads (also called goods) such as parcels, envelopes, bags, etc.

Such an automatic locker device is generally configured to enable various operations:
- the loading of loads into the automatic locker device by an operator (or delivery person);
- the collection (or retrieval) of loads by customers from the automatic locker device;
- the recovery (or emptying) of loads from the automatic locker device by the operator (in the case of loads not collected by customers).

There are numerous applications. For example, the invention applies to the automatic distribution of goods for customers who have placed orders (for example via the Internet). The invention is situated in this case in the field of out-of-home logistics and delivery, especially in the context of BtoC e-commerce. The term sometimes used here is "last-kilometer logistics" problems.

According to another example, the invention applies to the automatic distribution of goods for employees within an establishment (a warehouse, a hospital, etc.)

These examples of application are not exhaustive.

2. TEHCNOLOGICAL BACKGROUND

We shall strive more particularly here below in this document to describe the problems and issues existing in the above-mentioned application of automatic distribution of goods for customer who have placed orders (for example via the Internet). The invention of course is not limited to this particular application but is of interest for any application that has to cope with proximate or similar problems and issues.

The delivery of goods ordered online is the nerve center of e-commerce. In France, for example, in a context of a surge in the growth of e-commerce, the French postal authority (the Groupe La Poste) was planning to deploy thousands of automatic lockers for the collecting (or retrieval) of parcels throughout France by the end of 2016, situated in very busy thoroughfares or locations (such as transport stations, shopping centers or again in nerve centers in the middle of very densely populated cities).

Automatic lockers are a novel solution for collecting/removing parcels which come as an addition to existing modes of delivery (home delivery, post office delivery or delivery at pick-up points hosted by local businesses). Thus, this novel solution is simple, flexible in its use and entirely secured. Thus, a customer who places an order on the Internet and chooses to obtain delivery in an automatic locker receives for example a retrieval (or collection) code by email or by SMS when the parcel is made available (i.e. whether it has been placed in the automatic locker by a delivery person or by a carrier). All that the customer has to do then is to go to the automatic locker and type out the code on a man-machine interface (keypad or touch screen) of the automatic locker to retrieve his parcel.

One advantage of automatic lockers is that they enable internet users to withdraw or retrieve parcels 24/7. They also make it possible to differentiate between the time of deposition of the article and the time of its retrieval or collection by the customer (there is separation in time). As in the case of pick-up points, each party accomplishes half of the delivery and the deliver is done in a third location (there is spatial separation). The difference with the pick-up point lies in the automation of the process and the absence of intermediaries.

In a first known automatic locker technique, the delivery person places each of the parcels in one of the compartments of the automatic locker. When the customer goes to the automatic locker and types out his code on the keypad of the automatic locker, the compartment containing his parcel opens automatically.

One drawback of this first known automatic locker technique lies in the operation for loading items (parcels for example). Indeed, the delivery person must load the different parcels into the different compartments of the automatic locker. There is therefore an existing need to facilitate and increase the speed of the operation for loading items into the automatic locker.

Another drawback of this first known technique lies in the operation for removing or collecting goods (parcels for example). To retrieve his parcels, the customer must go before each of the compartments of the automatic locker. In addition, the compartments are disposed at different heights, and this may make them non-accessible for certain members of the public and ergonomical if the compartments are too high or too low). There is therefore an existing need to facilitate and increase the speed of the operation for removing goods from the automatic locker.

A second known technique is the "PackRobot" (registered mark) by the company Cleveron in which the automatic locker device comprises an area or a zone for the storage of parcels on trays (there are eight storage columns each containing a plurality of storage cells), a retrieval point (or window) for collecting parcels and handling means used to move a tray (with the parcel it bears) from the storages area to the retrieval point or vice versa. More specifically, the handling means comprise a lift or elevator and a device for horizontal translation in a constant plane.

During an operation for collecting or removing a parcel, the lift will search for a tray (with the parcel it supports) in one of the storage cells and convey it to the height of the retrieval point. Then, the horizontal translation device takes the tray (with the parcel it supports) before an aperture in the retrieval point (closed by a door except during the operation for handing over a parcel) thus enabling the user to take the parcel.

The lift and the horizontal translation device are also used for the operation for loading the parcels into the automatic locker device. In this case, for each parcel, the lift will look for an empty tray in one of the storage cells and take it to the height of the retrieval point. Then, the horizontal translation device will carry the empty tray to the aperture in the retrieval point thus enabling the delivery person to place the parcel on the tray. Then, the horizontal translation device will make the tray move back (with the parcel that it is supporting) up to the lift. Finally, the lift places the tray (with the parcel that it supports) in one of the storage cells.

One drawback of this second known technique is that the parcels are loaded one by one into the automatic locker device, through the retrieval point. This mode of unit loading leads to loading interruptions and a relatively lengthy loading time. In addition, it immobilizes the parcel-collection point during the loading phase, preventing retrieval by customers while the delivery person is introducing goods (such as parcels, bags or the like) into the automatic locker device.

In a third known technique, described in the patent document FR3007957 (filed by the firm Syleps), the automatic locker device comprises, in a volume demarcated by external walls forming a box (also called a chamber) comprising a gate and a point:
  a supporting structure (item storage zone) having item-storage cells, and
  at least one stacker crane (handing means), moving along the support structure and comprising means for grasping items in the storage cells.

The supporting structure comprises mobile handling trolleys presenting the storage cells. The loading (storage) of the items in the automatic locker device is performed by mobile trolleys: when the mobile trolleys are outside the box, an operator (delivery person) deposits the items in the cells; then the mobile trolleys are introduced into the box by the gate: finally, the trolleys are positioned and fixed to the ground, in proximity to moving rail of the stacker crane to make the cells accessible to the grasping means of the stacker crane. The retrieval (de-storage) of the items can then begin (for each item to be retrieved, the cell containing the item selected; then, the stacker crane is moved, and takes the item in the selected cell and conveys it to the retrieval point.

One drawback of the third known technique is that so long as all the mobile trolleys, preliminarily loaded with goods (items), have not been moved, positioned and immobilized within the box of the automatic locker device, it is not possible to retrieve the items.

Another drawback of the third known technique is that the height of the mobile trolleys and therefore the number of storage cells in height is reduced inter alia by constraints of stability of the mobile trolleys when they are being moved, as well as considerations related to the ergonomy and to the conditions of loading and transportation.

Another drawback of the known third technique is that, following the collection of the goods, the cells that become free are distributed among all the mobile trolleys. This principle requires that, in order to carry out the next phase of loading, the delivery person be either capable of taking out all the trolleys in order to locate the free cells needed for loading or be capable of locating the trolleys with the free cells in the box before taking them out and then take them out in order to load them, which is complicated and time-consuming Another drawback of the third known technique is that, if it becomes necessary to recover goods not collected by the final customer, the cells containing the items to be recovered are distributed among all the trolleys. This principle means that, in order to carry out a recovery stage, the delivery person must be either capable of taking out all the trolleys in order to locate the cells containing the goods to be recovered or capable of locating, in the box and before taking the trolleys out, all those trolleys that have cells containing goods to be recovered: this is a complicated and time-consuming task.

3. GOALS

The invention, in at least one embodiment, is aimed especially at overcoming these different drawbacks of the prior art.

More specifically, it is a goal in at least one embodiment of the invention to provide a technique (an automatic locker device and a corresponding method for handling loads) that reduces the time for loading loads (goods, articles etc.) and recovering those not collected (i.e. retrieved) by the final customer (or user).

At least one embodiment of the invention is also aimed at providing such a technique that is ergonomical.

It is another goal of at least one embodiment of the invention to provide such a technique that is simple and reliable in its design.

It is a complementary goal of at least one embodiment of the invention to provide such a technique that does not immobilize the parcel-retrieval point during the loading (or recovery) of loads and that thus enables the final customer (user) to retrieve a load during the loading or recovery of other loads.

It is a complementary goal of at least one embodiment of the invention to provide a technique of this kind that is not limited to the storage capacity of the automatic locker device.

4. SUMMARY

In at least one embodiment of the invention, there is proposed an automatic locker device of the type configured for a handling of loads with loading and retrieval operations, and comprising:
  at least one load storage zone,
  at least one load retrieval point,
  means for handling, configured to move loads to be retrieved from said at least one storage zone to said at least one retrieval point for the retrieval operations, and
  a module for managing said handling means;
said at least one storage zone and said at least one retrieval point are configured to be dedicated to the retrieval operations,
said automatic locker device furthermore comprises at least one buffer zone and at least one aperture configured to be dedicated to the loading operations and possibly to recovery operations, said at least one buffer zone being distinct from the at least one storage zone, and said at least one aperture being distinct from said at least one retrieval point and configured for an introduction of loads to be loaded into said at least one buffer zone, during loading operations,
and the module for managing is configured so that, in the loading operations, said handling means move the loads to be loaded from said at least one buffer zone, where they have been preliminarily loaded via said at least one aperture, towards said at least one storage zone.

As compared with the third prior art technique (which describes an automatic locker device comprising a storage zone (constituted by mobile trolleys), a collection or retrieval point and handling means (constituted by a stacker crane)), the proposed solution is distinguished by the implementing of at least one buffer zone and by a configuration of the handling means for the loading operations (moving of loads from the at least one buffer zone to the at least one storage zone).

Thus, the proposed solution offers several advantages as compared with the third known technique, especially:
  the loading time is reduced (there is no need to move, position and immobilize all the mobile trolleys within the automatic locker device);
  the (at least one) buffer zone being distinct from the (at least one) storage zone, it can have appropriate ergonomy facilitating the loading work on the part of the delivery person and therefore reducing musculo-skeletal disorders (MSDs);

the operating principle of loading is simple since the (at least one) buffer zone is dedicated and contains only cells dedicated to loading (and, as the case may be, to recovery, as discussed here below);

the retrieval point is not immobilized during the loading and the retrieval can be done during this operation.

According to one particular characteristic, the managing module is configured so that, in the recovery operations, said handling means move the loads to be recovered from said at least storage zone to said at least one buffer zone, and at least one aperture is configured for an exit of the loads to be recovered out of said at least one buffer zone, and out of the automatic locker device, during the recovery operations.

Thus, the handling means are also configured for recovery operations (moving of the loads from the at least one storage zone to the at least one buffer zone). Among the advantages listed further above for the loading operation (as compared with the third known technique), certain advantages are obtained also for the recovery operation. Thus: the recovery time is reduced; the (at least one) buffer zone can have appropriate ergonomy facilitating the recovery work of the delivery person; the operating principle of recovery is simple since the (at least one) buffer zone is dedicated and contains only cells dedicated to the loading and/or to the recovery; the retrieval point is not immobilized during the recovery.

According to one particular characteristic, said at least one storage zone comprises at least one rack-type shelving.

Thus, the (at least one) storage zone can have a high storage capacity. Unlike the third known technique (the storage zone of which consists of mobile trolleys), its height and therefore its storage capacity are not reduced by a height of the trolleys According to a first particular implementation, said at least one buffer zone is configured to receive at least one mobile trolley provided with a plurality of buffer cells, and said at least one aperture is configured for an introduction and an exit respectively of said at least one mobile trolley into and respectively out of said at least one buffer zone. The managing module is configured so that, in the loading operations, said handling means move the loads to be loaded from said plurality of buffer cells to said at least one storage zone and, in the recovery operations, said handling means move the loads to be recovered, from said at least one storage zone to said plurality of buffer cells, after said at least one mobile trolley has been introduced into said at least one buffer zone.

This first implementation is simple to use since it relies on mobile trolleys, for example of a type already on the market.

According to a second particular implementation, said at least one buffer zone comprises:

at least one rack-type shelving fixed and provided with a plurality of buffer cells; and said at least one aperture, configured for access to said buffer cells from the exterior of said at least one buffer zone;

and the managing module is configured so that, in the loading operations, said handling means move the loads to be loaded, from said plurality of buffer cells to said at least one storage zone and, in the recovery operations, said handling means move the loads to be recovered from said at least one storage zone to said plurality of buffer cells.

In this second implementation, the use of at least one rack-type shelving makes it possible to do away with the need for using mobile trolleys to be moved.

According to a third particular implementation, said at least one buffer zone comprises:

at least one rack-type shelving comprising a mobile part provided with a plurality of buffer cells; and said at least one aperture, configured for an at least partial exit and re-introduction, respectively, of said mobile part respectively out of and into said at least one buffer zone;

and the managing module is configured so that, in the loading operations, said handling means move the loads to be loaded from said plurality of buffer cells to said at least one storage zone and, in the recovery operations, said handling means move the loads to be recovered from said at least one storage zone to said plurality of buffer cells, after said at least one mobile trolley has been introduced into said at least one buffer zone.

This third implementation is distinguished from the second one in that the at least one rack-type shelving comprises a mobile part on which there are the buffer cells. This provides for more ergonomical access to the buffer cells.

According to one particular characteristic of the third particular implementation, said at least one rack-type shelving of said at least one buffer zone comprises a first retractable slide type device configured to provide mobility to the mobile part.

According to one particular characteristic of any one of the first, second and third particular implementations, at least one of said buffer cells is mounted on a second retractable slide type of device configured to provide mobility to said buffer cell relative to a supporting structure included in said at least one mobile trolley or in said at least one rack-type shelving of said at least one buffer zone.

This enables more ergonomical access to the loads (goods, articles etc.) contained in the buffer cells.

In another embodiment of the invention, a method is proposed for handling loads (by means of an automatic handling device as mentioned here above) comprising, for a loading operation, the following successive steps:

insertion of at least one load to be loaded into said at least one buffer zone, via said at least one aperture; and moving of said at least one load to be loaded by said handling means from said at least one buffer zone to said at least one storage zone.

Thus, the loading operation is simple to implement.

According to one particular characteristic, for a handing of loads by an automatic locker device according to the first implementation, the step of insertion comprises the following steps:

taking out of said at least one mobile trolley from said at least one buffer zone;

insertion of at least one load to be loaded into at least one of said buffer cells of said at least one mobile trolley;

introduction of said at least one mobile trolley into said at least one buffer zone.

According to one particular characteristic, for a handling of loads by an automatic locker device according to the third implementation, the step of insertion comprises the following steps:

at least partial taking of said mobile part out of said at least one buffer zone;

insertion of at least one load to be loaded into at least one of said buffer cells of said mobile part;

introduction of said mobile part into said at least one buffer zone.

According to one particular characteristic, the method comprises, for a recovery operation, the following steps:

moving of at least one load to be recovered, by said handling means, from said at least one storage zone to said at least one buffer zone; and retrieval of said at least one load to be recovered, out of said at least one buffer zone.

Thus, the recovery operation is simple to implement.

According to one particular characteristic, for a handling of loads by an automatic locker device according to the first implementation, the step of retrieval comprises the following steps:
- taking out of said at least one mobile trolley from said at least one buffer zone, via said at least one aperture;
- retrieval of at least one load to be recovered out of the buffer cells of said at least one mobile trolley;
- introduction of said at least one mobile trolley into said at least one buffer zone, via at least one aperture.

According to one particular characteristic, for a handling of loads by an automatic locker device according to the third implementation, the step of retrieval comprises the following steps:
- at least partial taking out of said mobile part from said at least one buffer zone, via said at least one aperture;
- retrieval of at least one load to be recovered out of the buffer cells of said mobile part;
- introduction of said mobile part into said at least one buffer zone, via said at least one aperture.

According to one particular characteristic, for a handling of loads by means of an automatic locker device according to the first implementation, the method comprises, for combined operations of recovery and operations of loading, the following successive steps:
- moving of at least one load to be recovered, by said handling means, from said at least one storage zone to said at least one of the buffer cells of said at least one mobile trolley positioned in said at least one buffer zone;
- taking out of said at least one mobile trolley from said at least one buffer zone, via said at least one aperture;
- retrieval of said at least one load to be recovered out of the buffer cells of said at least one mobile trolley;
- insertion of at least one load to be loaded in at least one of said buffer cells of said at least one mobile trolley;
- introduction of said at least one mobile trolley into said at least one buffer zone via said at least one aperture; and
- moving of said at least one load to be loaded, by said handling means, from said at least one buffer cell of said at least one mobile trolley to said at least one storage zone.

According to one particular characteristic, for a handling of loads by an automatic locker device according to the second implementation, the method comprises, for combined operations of recovery and operations of loading, the following successive steps:
- moving of at least one load to be recovered, by said handling means, from said at least one storage zone to said at least one of the buffer cells of said at least one rack-type shelving of said at least one buffer zone;
- retrieval of said at least one load to be recovered out of said buffer cells, via said at least one aperture;
- insertion of at least one load to be loaded into at least one of said buffer cells, via said at least one aperture;
- moving of said at least one load to be loaded, by said handling means, from said at least one buffer cell to said at least one storage zone.

According to one particular characteristic, for a handling of loads by means of an automatic locker device according to the third implementation, the method comprises, for combined operations of recovery and operations of loading, the following successive steps:
- moving of at least one load to be recovered, by said handling means, from said at least one storage zone to at least one of the buffer cells of said mobile part positioned in said at least one buffer zone;
- taking out of said mobile part from said at least one buffer zone, via said at least one aperture;
- retrieval of said at least one load to be recovered out of the buffer cells of said mobile part;
- insertion of at least one load to be loaded into at least one of said buffer cells of said mobile part;
- introduction of said mobile part into said at least one buffer zone; via said at least one aperture; and
- moving of said at least one load to be delivered, by said handling means, from said at least one buffer cell of said mobile part to said at least one storage zone.

According to one particular characteristic, for a handling of loads by means of an automatic locker device according to the first implementation, the method comprises, for actions carried out in parallel, the following successive steps:
- during an insertion of at least one first load to be loaded and/or a recovery of at least one first load to be recovered in a first mobile trolley positioned outside said at least one buffer zone, said handling means move at least one second load to be recovered from said at least one storage zone to a second mobile trolley positioned in said at least one buffer zone and/or move at least one second load to be loaded from said second mobile trolley to said at least one storage zone;
- via said at least one aperture, the second mobile trolley is taken out of said at least one buffer zone and the first mobile trolley is introduced into said at least one buffer zone;
- during a recovery of said at least one second load to be recovered and/or an insertion of at least one third load to be loaded into the second mobile trolley positioned outside said at least one buffer zone, said handling means move said at least one first load to be loaded from the first mobile trolley, positioned in said at least one buffer zone, to said at least one storage zone and/or move at least one third load to be recovered from said at least one storage zone to the first mobile trolley, positioned in said at least one buffer zone.

According to one particular characteristic, for a handling of loads by an automatic locker device according to the second implementation, the method comprises, for actions carried out in parallel, the following successive steps:
- during an insertion of at least one first load to be loaded and/or a recovery of at least one first load to be recovered in a said shelving of said at least one buffer zone, said handling means move at least one second load to be recovered from said at least one storage zone to another said shelving of said at least one buffer zone and/or move at least one second load to be loaded from said other shelving of said at least one buffer zone to said at least one storage zone;
- during a retrieval of said at least one second load to be recovered and/or an insertion of at least one third load to be loaded in said other shelving of said at least one buffer zone, said handling means move said at least one first load to be loaded from said shelving of said at least one buffer zone towards said at least one storage zone and/or move at least one third load to be recovered from said at least one storage zone to said shelving of said at least one buffer zone.

According to one particular characteristic, for a handling of loads by an automatic locker device according to the third implementation, the method comprises, for actions carried out in parallel, the following successive steps:

during an insertion of at least one load to be loaded and/or a recovery of at least one first load to be recovered in a first mobile shelving part, positioned at least partially outside said at least one buffer zone, said handling means move at least one second load to be recovered from said at least one storage zone to a second mobile shelving part, positioned in said at least one buffer zone and/or move at least one second load to be loaded from said second mobile part to said at least one storage zone;

the second mobile part is at least partially taken out of said at least one buffer zone and the first mobile part is introduced into said at least one buffer zone;

during a recovery of said at least one second load to be recovered and/or an insertion of at least one third load to be loaded into the second mobile part positioned at least partially outside said at least one buffer zone, said handling means move said at least one first load to be loaded from the first mobile part, positioned in said at least one buffer zone, to said at least one storage zone and/or move at least one third load to be recovered from said at least one buffer zone to the first mobile part, positioned in a said at least one buffer zone.

5. LIST OF FIGURES

Other features and advantages of the invention shall appear from the following description, given by way of an indicative and non-exhaustive example and from the appended figures, of which:

FIGS. 1, 2A, 2B, 3A and 3B are different views of an automatic locker device according to one particular embodiment of the invention:

FIG. 1 is a three-quarter or perspective view, from a first angle of view, showing two external walls of the automatic locker device;

FIGS. 2A and 2B are partial side views (without the external walls) of the automatic locker device at two stages of a recovery operation;

FIGS. 3A and 3B are perspective views, along a second angle of view, showing two other external walls, at two other stages of the recovery operation;

FIG. 8A is a flowchart of a recovery operation (combined if necessary, with a loading operation), in the case of loads handled with the use of a support;

FIG. 8B is a flowchart of a recovery operation (combined if necessary, with a loading operation) in the case of loads handled without use of a support;

Figure 9A:
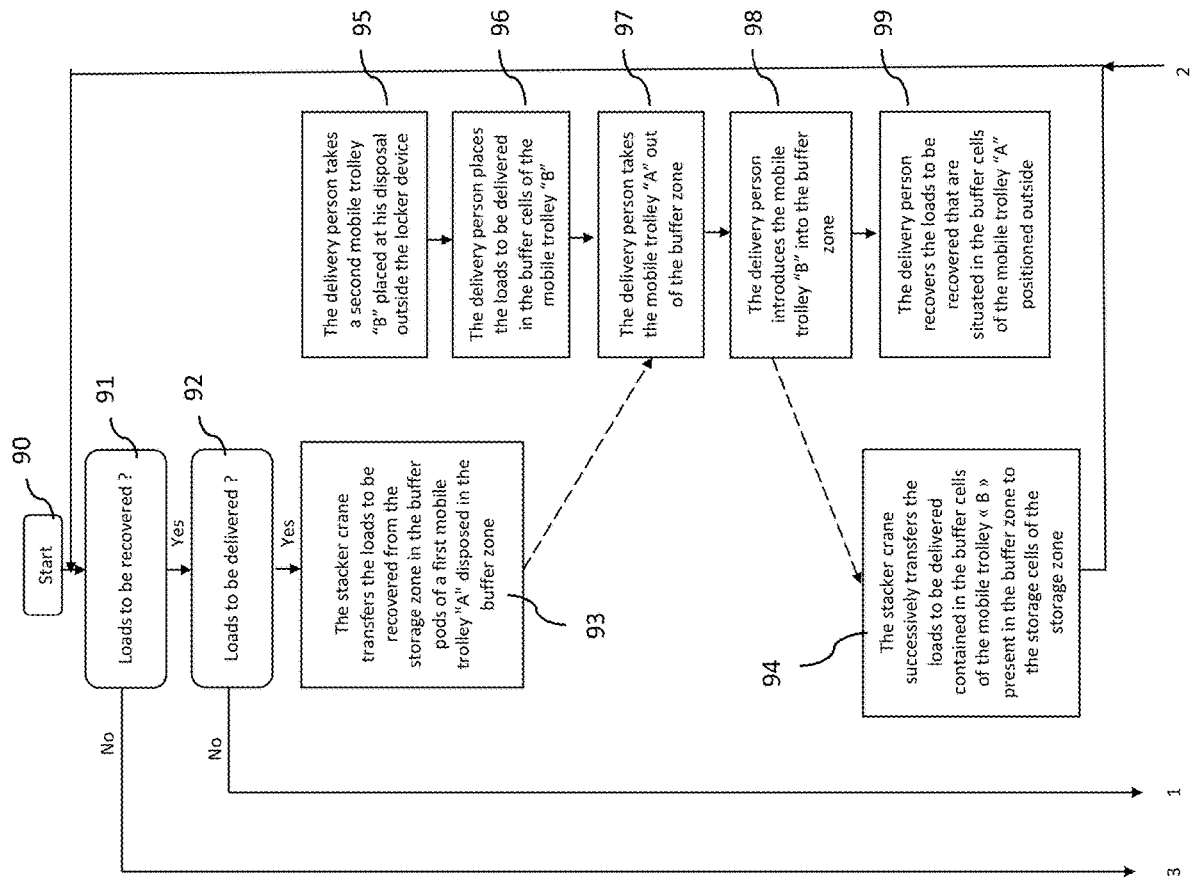
Figure 9B:
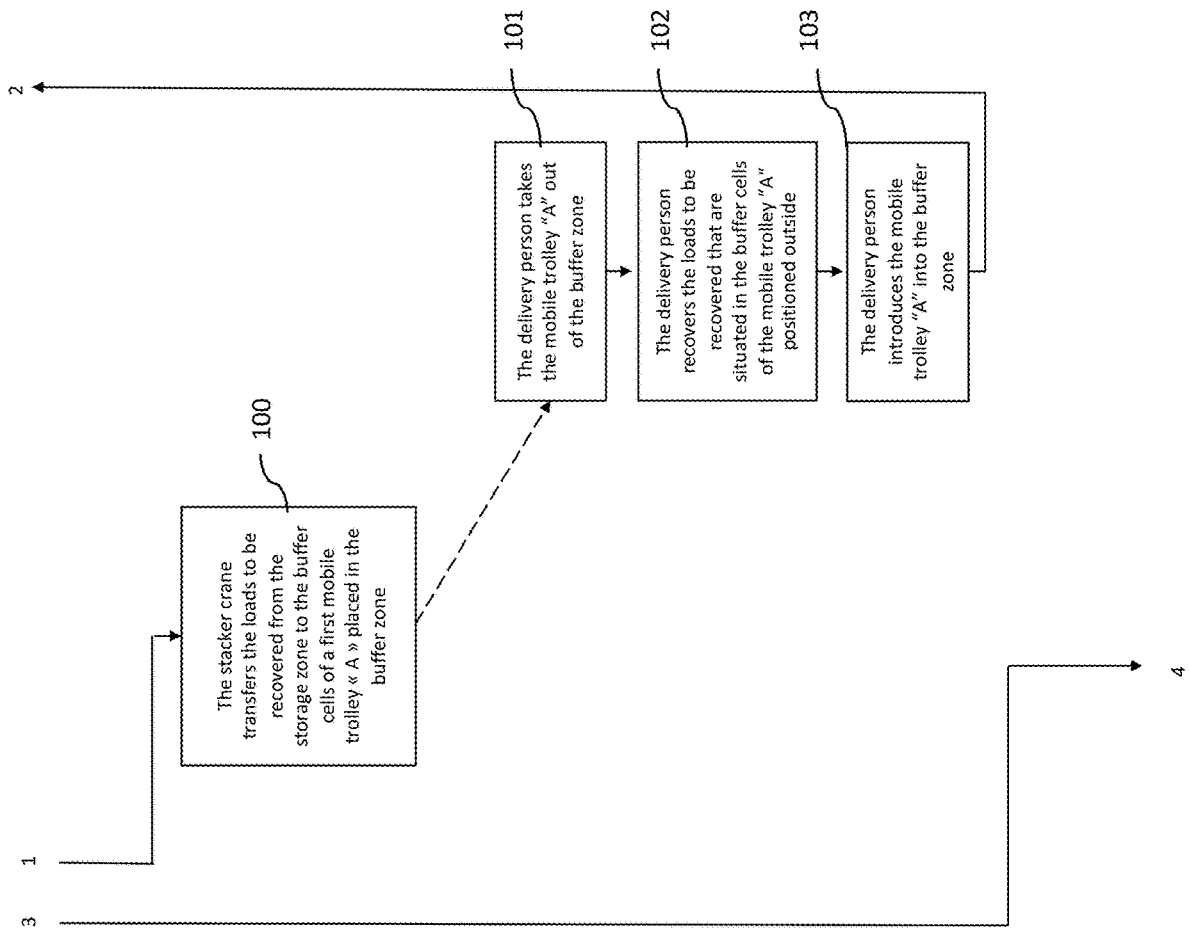
Figure 9C:
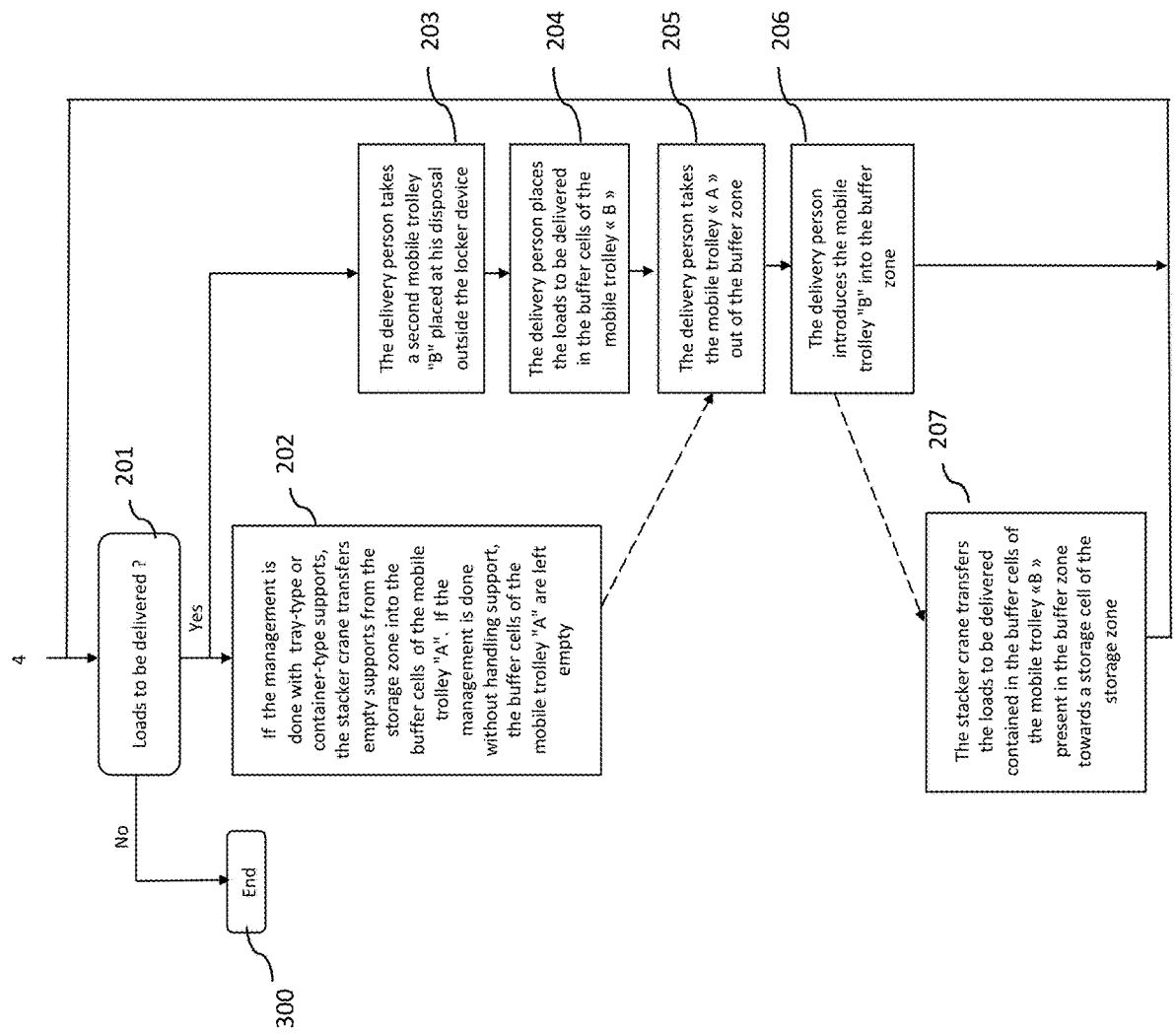

FIGS. 9A, 9B and 9C present three parts of a same flowchart showing a detailed view of the combined operations of loading and recovery with use of two mobile trolleys;

FIG. 10 is a simplified side view of a mobile trolley having a retractable slide type device.

6. DETAILED DESCRIPTION

In all the figures of the present document, the identical elements and steps are designated by a same numerical reference.

Referring now to FIGS. 1, 2A, 2B, 3A and 3B, we present an automatic locker device 1 according to particular embodiment of the invention.

This device is configured for a handling of loads with operations of loading and recovery carried out by the operator (or delivery person) and operations of retrieval carried out by the users (customers).

Figure 2A:
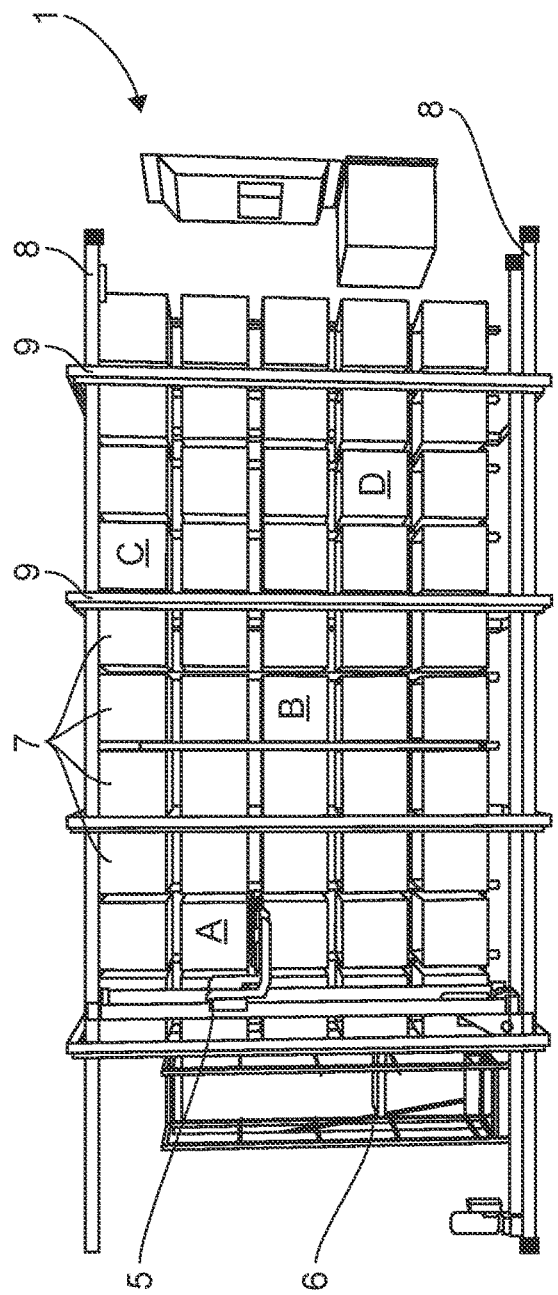
Figure 2B:
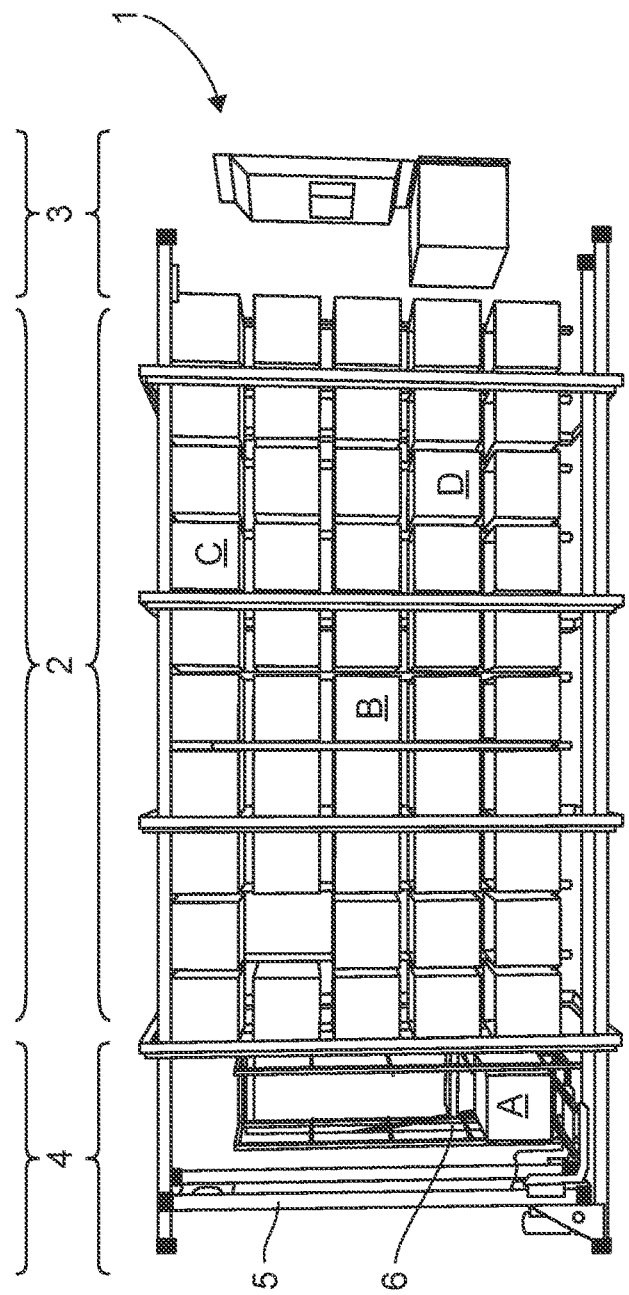
Figure 3B:
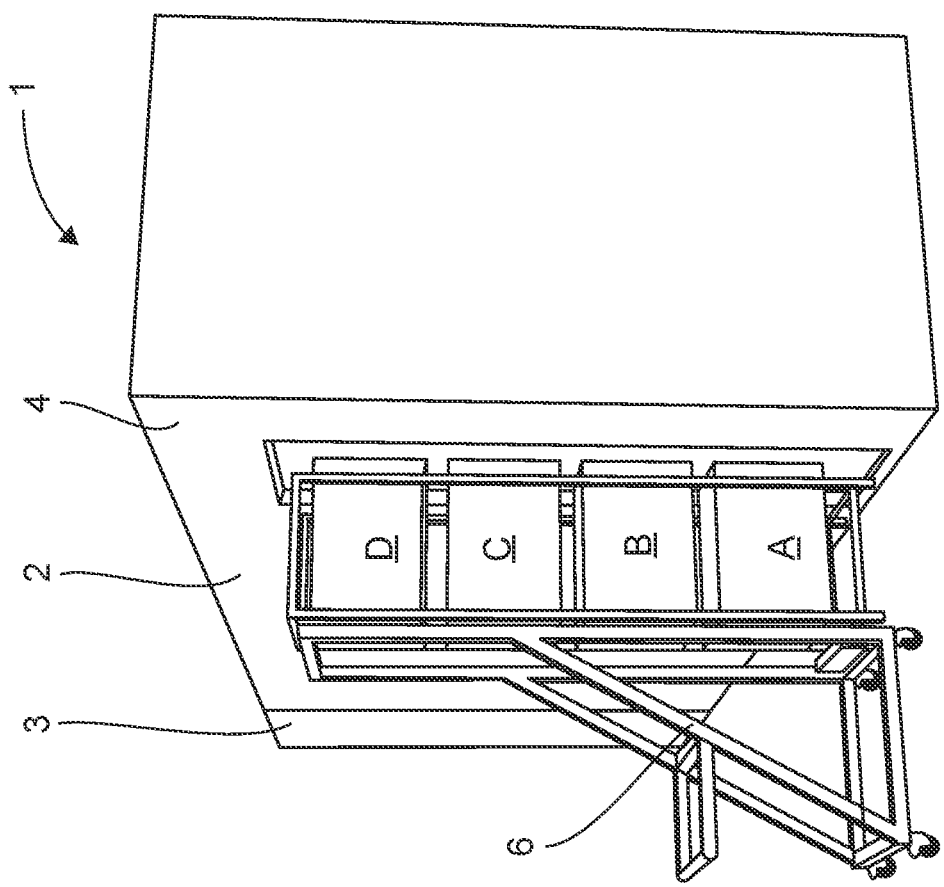
Figure 3A:
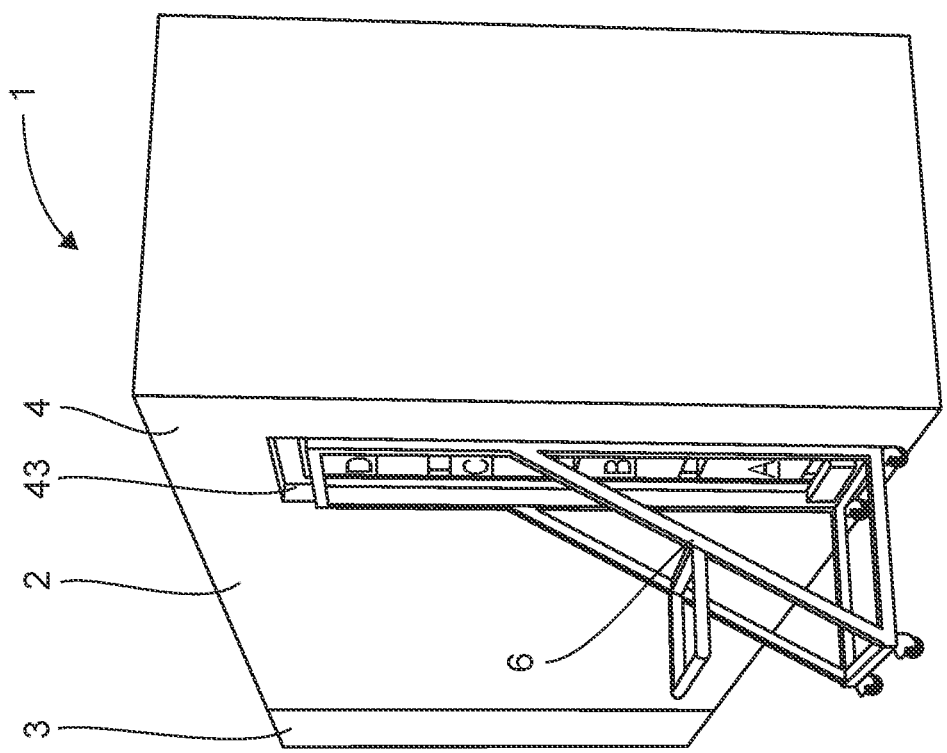

It comprises the following within a volume demarcated by external walls forming a box (or chamber) (these external walls are shown in FIGS. 1, 3A and 3B, but not in FIGS. 2A and 2B):

(at least) one storage zone 2, configured to store loads 7 (goods, articles, parcels, etc.) to be collected or retrieved by the users;

(at least) one buffer zone 4, configured to temporarily receive loads during loading and recovery operations;

(at least) one retrieval point 3 configured for the retrieval of loads by users; and (at least) one stacker crane 5 (or any other type of handling means, such as for example a mobile robot), comprising means for grasping loads, that is guided by horizontal rails 8 to move along the storage zone 2, from the buffer zone 4 and up to the retrieval point 3, and that is configured to move loads:

from the storage zone 2 to the retrieval point 3 for the retrieval operations;

from the buffer zone 4 to the storage zone 2 for the loading operations (loads to be collected (retrieved) by the users); and from the storage zone 2 to the buffer zone for the recovery operations (for recovering loads not retrieved by the users).

The storage zone 2 comprises for example (at least) one rack-type shelving (also called a "storage shelf" or "storage structure") with several columns Each column can be used to store several superimposed loads 7, for example using decks (which may or may not be detachable) fixed to vertical uprights 9 of the shelving. These decks define superimposed storage locations (also called "storage cells" or "storage pods"), each intended to receive one load (or several loads in one variant). The storage zone 2 can be adapted to the constraints of physical layout and flow, and depending on different cases they may be rectilinear, L-shaped, T-shaped or U-shaped or have any other shape. The storage zone 2 can also include several rack-type shelvings.

The loads 7 are handled:

either with a tray-type handling support (on which the load is placed) or a container-type support (in which the load is placed), this support being capable of forming a detachable deck (in the above-mentioned sense);

or without a support (this is the case for example of a parcel that can be entered by the grasping means of the stacker crane 5 and move, for example from one of the buffer cells of the buffer zone 4 towards one of the storage cells of the storage zone 2).

The buffer zone 4 is configured to receive (at least) one mobile trolley 6 (mounted on rollers for example) provided with a plurality of buffer cells (also called "buffer pods") organized in the form of a column or columns. The mobile trolley comprises a single four-cell column in the example illustrated in the figures. One of the external walls of the buffer zone 4 comprises an aperture 43 for introducing the mobile trolley 6 into the buffer zone 4 or else to take it out of the buffer zone 4. After it has been introduced into the buffer zone, its buffer cells are accessible to the grasping means of the stacker crane 5. Thus, the stacker crane 5 can move the loads from the buffer cells of the mobile trolley 6 to the storage zone, for the loading operations and from the storage zone to the buffer cells of the mobile trolley 6, for the recovery operations.

In one particular implementation, each buffer cell is mounted on a retractable slide type device configured to provide mobility to the buffer cell relative to a support structure included in the mobile trolley 6, as illustrated in FIG. 10.

The stacker crane 5 is for example controlled by a management module (not shown) so that it carries out the desired actions described in detail here below. The management module can be set up equally well on a reprogrammable computing machine (for example a PC computer, a DSP processor, a microcontroller, etc.) executing a program comprising a sequence of instructions, or on a dedicated computing machine (for example a set of logic gates such as an FPGA or an ASIC or any other hardware module).

By way of an illustrative example, FIGS. 2A, 2B, 3A and 3B show different successive stages (states) of an operation for recovering four loads referenced A, B, C and D (not collected (retrieved) by the customers). Initially (FIG. 2A), these four loads are stored in the storage zone 2. Then, the stacker crane 5 moves them from the storage zone 2 to the buffer cells of the mobile trolley 6 present in the buffer zone 4. In FIG. 2B, the load A has been placed on the mobile trolley 6. In FIG. 3A, the four loads A, B, C and D have been placed on the mobile trolley 6. Then, the mobile trolley 6 is brought out of the buffer zone 4 (FIG. 3B) in order to enable the delivery person to recover the four loads A, B, C and D.

Figures 7A, 7B:
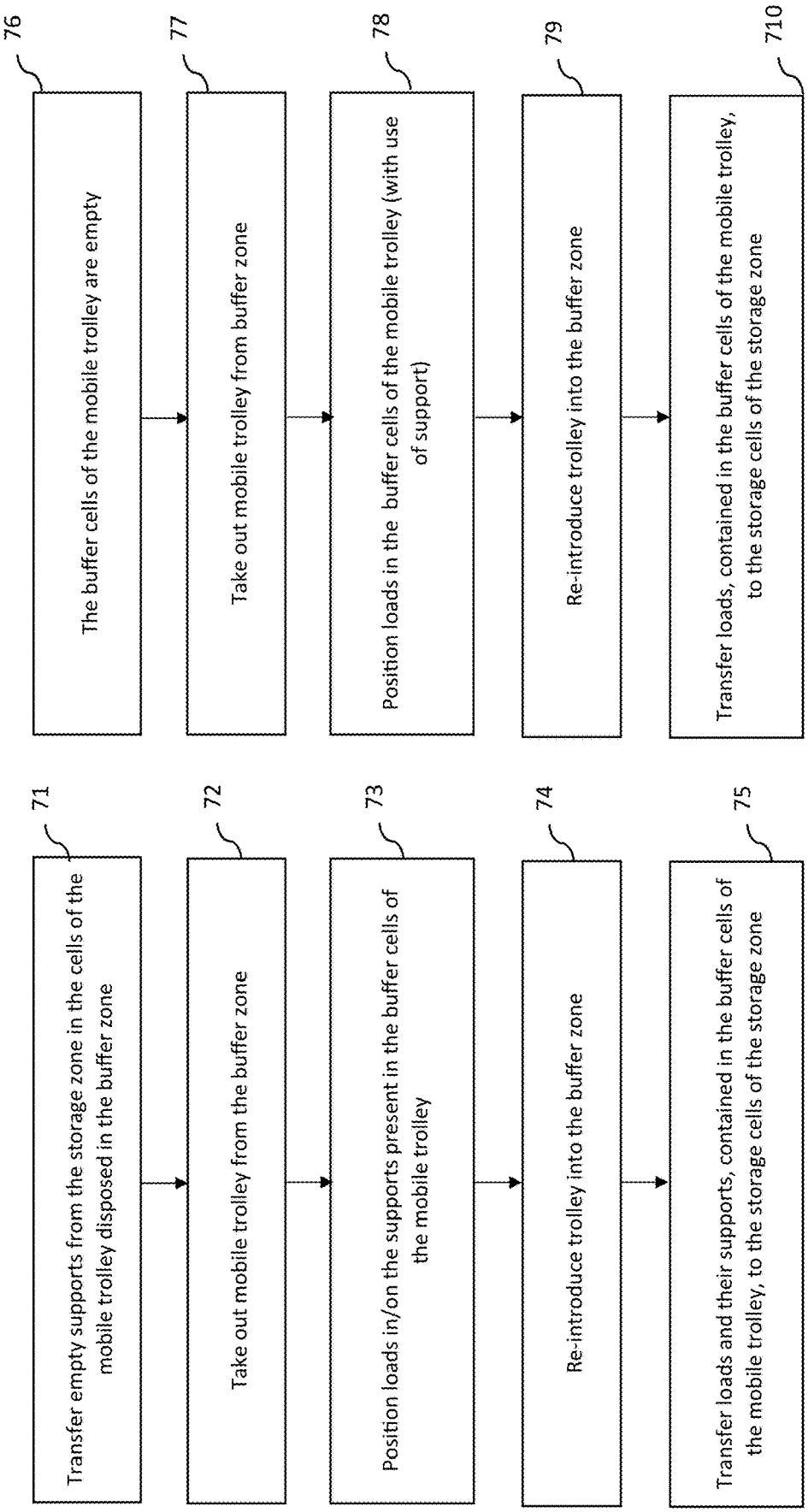
FIG. 7A is a flowchart of a loading operation in the case of loads handled with use of a support.
FIG. 7B is a flowchart of a loading operation in the case of loads handled without use of a support.

FIG. 7A is a flowchart of a loading operation, in the case of loads handled with the use of a handling support (of the tray or container type).

At the beginning of the loading cycle, in a step 71, the stacker crane 5 transfers empty supports from the storage cells of the storage zone 2 to the buffer cells of the mobile trolley 6 (the mobile trolley being present in the buffer zone 4).

At a step 72, a delivery person (or a robot) takes the mobile trolley 6 out of the buffer zone 4.

At a step 73, the delivery person (or the robot) positions the loads (loads to be delivered) on or in the supports present in the buffer cells of the mobile trolley.

At a step 74, the delivery person (or the robot) re-introduces the mobile trolley 6 into the buffer zone 4.

At a step 75, the stacker crane 5 transfers the loads contained in the buffer cells of the mobile trolley (present in the buffer zone 4) successively to the storage cells of the storage zone 2. In this step 75, each load is transferred with the support on which or in which it is situated.

FIG. 7B is a flowchart of a loading operation, in the case of loads handled without the use of a handling support.

At the beginning of the loading cycle, at a step 76, the buffer cells of the mobile trolley 6 are empty.

At a step 77, a delivery person (or a robot) take the mobile trolley 6 out of the buffer zone 4.

At a step 78, the delivery person (or the robot) positions the loads (loads to be delivered) directly in the buffer cells of the mobile trolley (without use of any support).

At a step 79, the delivery person (or the robot) re-introduces the mobile trolley 6 into the buffer zone 4.

At a step 710, the stacker crane 5 successively transfers the loads contained in the buffer cells of the mobile trolley (present in the buffer zone 4) to the storage cells of the storage zone 2.

FIG. 8A presents a flowchart of an operation for recovering loads (possibly combined with an operation for loading other loads (loads to be delivered)) in the case of loads handled with the use of a support.

At the beginning of the recovery cycle, at a step 81, the stacker crane 5 transfers supports carrying or containing loads to be recovered from the storage zone 2 to the buffer cells of the mobile trolley 6 (present in the buffer zone 4).

At a step 82, a delivery person (or a robot) takes the mobile trolley 6 out of the buffer zone 4.

At a step 83, the delivery person (or the robot) recovers the loads present on or in the supports present in the buffer cells of the mobile trolley.

We then distinguish two cases depending on whether a new loading cycle has to be executed or not.

If no new loading cycle has to be executed, the operation passes to the final step 84 in which the delivery person (or the robot) re-introduces the empty trolley into the buffer zone 4.

If a new loading cycle has to be executed, the operation passes to the step 85 in which the delivery person (or the robot) positions other loads (loads to be delivered) on or in the supports present in the buffer cells of the mobile trolley.

The step 85 is followed by a final step 86 in which the stacker crane 5 transfers the other loads and their supports (contained in the buffer cells of the mobile trolley 6 present in the buffer zone 4) towards the storage cells of the storage zone 2.

FIG. 8B presents the flowchart of an operation for recovering loads (possibly combined with an operation for loading other loads) in the case of loads handled without the use of a support.

At the beginning of the recovery cycle, at a step 87, the stacker crane 5 transfers loads to be recovered from the storage zone 2 to the buffer cells of the mobile trolley 6 (present in the buffer zone 4).

At a step 88, a delivery person (or a robot) takes the mobile trolley 6 out of the buffer zone 4.

At a step 89, the delivery person (or the robot) recovers the loads present in the buffer cells of the mobile trolley (directly, without support).

We then distinguish between two cases depending on whether or not a new loading cycle has to be executed.

If no new loading cycle has to be executed, the operation passes to the final step 810 in which the delivery person (or the robot), re-introduces the empty trolley into the buffer zone 4.

If a new loading cycle has to be executed, the operation passes to the step 811 in which the delivery person (or the robot) positions other loads (loads to be delivered) in the buffer cells of the mobile trolley.

The step 811 is followed by a final step 812 in which the stacker crane 5 transfers the other loads (contained in the buffer cells of the mobile trolley 6 present in the buffer zone 4) towards the storage cells of the storage zone 2.

The FIGS. 9A, 9B and 9C present three parts of a same flowchart giving a detailed view of the combined operations of loading and recovery with the use of two mobile trolleys.

In order to reduce the loading and recovery time, it is proposed to use two mobile trolleys to parallelize the actions carried out by the delivery person (or the robot) and the actions carried out by the stacker crane 5.

The general principle is the following: while the delivery person (or the robot) loads or recovers the loads in the buffer cells of a first mobile trolley disposed outside the buffer zone 4, a second mobile trolley is disposed in the buffer zone 4 enabling the stacker crane 5 to carry out the movements of the transfer of loads from the buffer zone 4 to the storage zone of vice versa.

The precise operation is described in detail here below.

The step 90 corresponds to the start of the procedure, after which it is detected whether there are loads to be recovered (test step 91) or whether there are loads to be delivered (test steps 92 and 201).

FIG. 9A If there are loads to be recovered (positive response at the test step 91) and if there are loads to be delivered (positive response at the test step 92), the steps 93 to 99 are performed, and then the operation returns to the start of the procedure (i.e. in again carrying out of test of the steps 91 and 92).

At the step 93, the stacker crane 5 transfers the loads to be recovered from the storage zone to the buffer cells of a first mobile trolley "A" disposed in the buffer zone.

In the meantime, in the step 95, the delivery person takes a second mobile trolley "B" placed at his disposal outside the automatic locker device. At the step 96, he places loads to be delivered in the buffer cells of this second carrier "B".

When the stacker crane 5 has finished transferring the loads to be recovered to the first mobile trolley (step 93 terminated) and when the delivery person has finished loading the second mobile trolley "B" (step 96 terminated), the delivery person takes the first mobile trolley "A" out of the buffer zone and introduces the second mobile trolley "B" into the buffer zone (steps 97 and 98).

At the step 94, the stacker crane 5 transfers the loads to be delivered from the buffer cells of the second mobile trolley "B" of the buffer zone to the storage zone while, at the step 99, the delivery person collects the loads to be recovered from the mobile trolley "A" positioned outside the automatic locker device.

FIG. 9B

If there are loads to be recovered (positive response at the test step 91) and if there are no loads to be delivered (negative response at the test step 92), the steps 100 to 103 are performed and then the operation returns to the start of the procedure (i.e. the tests of the steps 91 and 92 are performed again).

At the step 100, the stacker crane 5 transfers the loads to be recovered from the storage zone to the buffer cells of a first mobile trolley "A" positioned in the buffer zone.

At the step 101, the delivery person takes the first mobile trolley "A" out of the buffer zone.

At the step 102, the delivery person collects the loads to be recovered from the mobile trolley "A" positioned outside the automatic locker device.

At the step 103, the delivery person re-introduces the first mobile trolley "A" into the buffer zone.

FIG. 9C

If there are no loads to be recovered (negative response at the test step 91) and if there are loads to be delivered (positive response at the test step 201) the steps 202 to 207 are performed and then the operation returns to the test step 201.

At the step 202, if the management is done with tray type or container type load supports, the stacker crane 5 transfers empty supports from the storage zone to the buffer cells of the mobile trolley "A" in order to enable the use of the first mobile trolley "A" for subsequent loading. If the management is done without handling support, the buffer cells of the mobile trolley "A" are left empty.

In the meantime, at the step 203, the delivery person takes a second mobile trolley "B" placed at his disposal outside the automatic locker device. At the step 204, he places loads to be delivered in the buffer cells of this second trolley "B".

At the step 205, the delivery person takes the mobile trolley "A" out of the buffer zone and at the step 206, he introduces the second mobile trolley "B" into the buffer zone.

At the step 207, the stacker crane 5 transfers the load to be delivered from the buffer cells of the second mobile trolley "B" of the buffer zone to the storage zone.

If there are no loads to be recovered (negative response at the test step 91) and if there are no loads to be delivered (negative response at the test step 201), the procedure is terminated (final step 300).

At the end of the procedure, the mobile trolley situated outside the automatic locker device is empty of loads.

Figure 6:
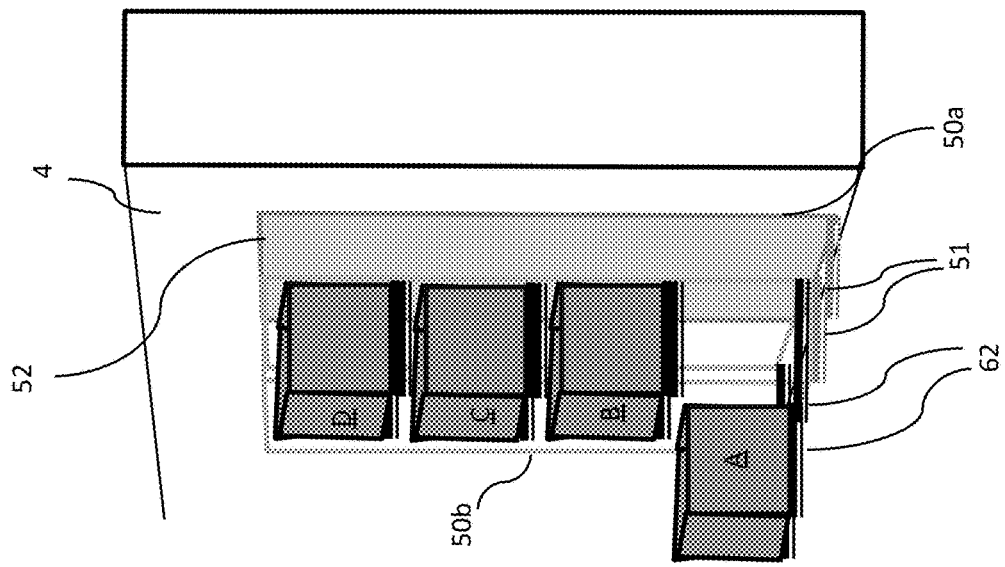
FIGS. 4, 5 and 6 are perspective views, along the second angle of view, of the automatic locker device of FIG. 1, illustrating three variants of implementation of the buffer zone.
Figure 5:
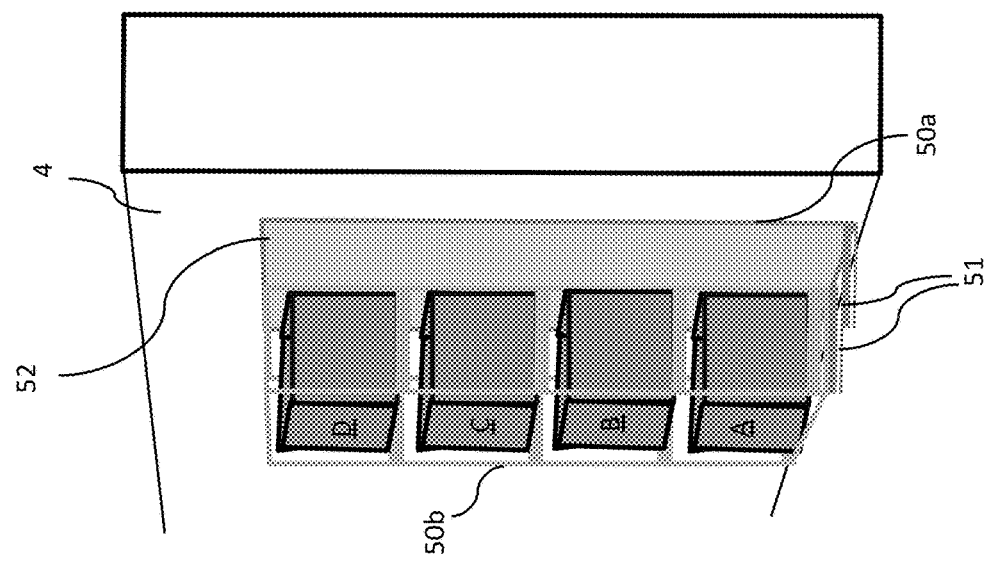
Figure 4:
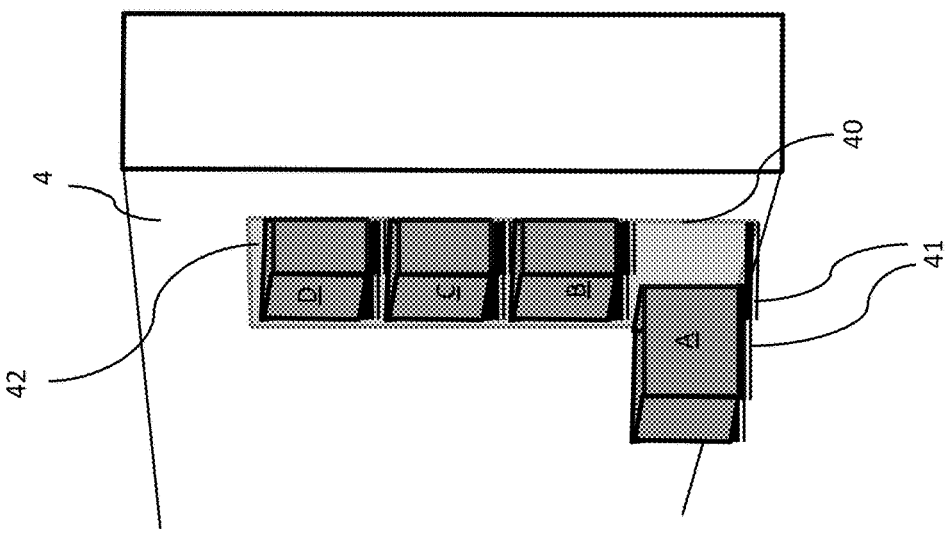

FIGS. 4, 5 and 6 are three-quarter views or views in perspective, along the second angle of view, of the automatic locker device of FIG. 1, illustrating three alternative modes of implementation of the buffer zone 4.

In these variants, the mobile trolley or trolleys described further above are replaced by one or more rack-type shelvings 40, 50a (which should not be mistaken for the rack-type shelving of the storage zone 2).

In the first alternative implementation illustrated in FIG. 4, the buffer zone 4 comprises a rack-type shelving 4 fixed and provided with a plurality of buffer cells. It also comprises (at least) one aperture 42 for access to these buffer cells from the exterior of the buffer zone 4. Each buffer cell is mounted on a retractable slide type device 41 configured to provide the buffer cell with mobility relative to a support structure included in the rack-type shelving 40.

In the second alternative implementation illustrated in FIG. 5, the buffer zone 4 comprises a rack-type shelving 50a comprising a mobile part 50b provided with a plurality of buffer cells (in order to enable more ergonomical access to these buffer cells). It also comprises (at least) one aperture 52 to at least partially take out (and re-introduce respectively) said mobile part out of and (respectively into) the buffer zone 4. The mobility of the mobile part 50b is for example provided by a retractable slide type device 51.

The third alternative implementation illustrated in FIG. 6 is distinguished from the second variant in that each buffer cell is also mounted on a retractable slide type device 62 configured to provide mobility to the buffer cell as compared with the mobile part 5b of the rack-type shelving 50a. This is done in order to enable more ergonomical access to the contents of the buffer cells.

The invention claimed is:

1. An automatic locker device configured for handling loads with loading and retrieval operations, and comprising:
at least one load storage zone dedicated to the retrieval operations;
at least one load retrieval point dedicated to the retrieval operations;
handling means for handling, configured to move loads to be retrieved from said at least one storage zone to said at least one retrieval point for the retrieval operations;
at least one buffer zone and at least one aperture configured to be dedicated at least to the loading operations, said at least one buffer zone being distinct from the at least one storage zone, and said at least one aperture being distinct from said at least one retrieval point and configured for an introduction of loads to be loaded into said at least one buffer zone, during loading operations;
a module for managing said handling means configured so that, in the loading operations, said handling means move the loads to be loaded from said at least one buffer zone, where they have been preliminarily loaded via said at least one aperture, towards said at least one storage zone; and at least one mobile trolley provided with a plurality of buffer cells, wherein:

said at least one buffer zone is configured to receive the at least one mobile trolley;

said at least one aperture is configured for an introduction and an exit respectively of said at least one mobile trolley into and respectively out of said at least one buffer zone;

the managing module is configured so that, in the loading operations, said handling means moves the loads to be loaded from said plurality of buffer cells to said at least one storage zone and, in the recovery operations, said handling means moves the loads to be recovered, from said at least one storage zone to said plurality of buffer cells, after said at least one mobile trolley has been introduced into said at least one buffer zone; and at least one of said buffer cells is mounted on a retractable slide type of device configured to provide mobility to said buffer cell relative to a supporting structure included in said at least one mobile trolley of said at least one buffer zone.

2. The automatic locker device according to claim 1, wherein the managing module is configured so that, in the recovery operations, said handling means move the loads to be recovered from said at least storage zone to said at least one buffer zone, and said at least one aperture is configured for an exit of the loads to be recovered out of said at least one buffer zone, and out of the automatic locker device, during the recovery operations.

3. The automatic locker device according to claim 1, wherein said at least one storage zone comprises at least one rack-type shelving.

4. A method for handling of loads by an automatic locker device for handling loads with loading and retrieval operations, the method comprising:

providing the automatic locker device, which comprises:

at least one load storage zone dedicated to the retrieval operations;

at least one load retrieval point dedicated to the retrieval operations;

handling means for handling, configured to move loads to be retrieved from said at least one storage zone to said at least one retrieval point for the retrieval operations;

at least one buffer zone and at least one aperture configured to be dedicated at least to the loading operations, said at least one buffer zone being distinct from the at least one storage zone, and said at least one aperture being distinct from said at least one retrieval point and configured for an introduction of loads to be loaded into said at least one buffer zone, during loading operations;

a module for managing said handling means configured so that, in the loading operations, said handling means move the loads to be loaded from said at least one buffer zone, where they have been preliminarily loaded via said at least one aperture, towards said at least one storage zone;

at least one mobile trolley provided with a plurality of buffer cells; and for a loading operation, the following successive steps:

insertion of at least one load to be loaded into said at least one buffer zone, via said at least one aperture; and moving said at least one load to be loaded by said handling means from said at least one buffer zone to said at least one storage zone, wherein:

said at least one buffer zone is configured to receive the at least one mobile trolley;

said at least one aperture is configured for an introduction and an exit respectively of said at least one mobile trolley into and respectively out of said at least one buffer zone;

the managing module is configured so that, in the loading operations, said handling means moves the loads to be loaded from said plurality of buffer cells to said at least one storage zone and, in the recovery operations, said handling means moves the loads to be recovered, from said at least one storage zone to said plurality of buffer cells, after said at least one mobile trolley has been introduced into said at least one buffer zone; and at least one of said buffer cells is mounted on a retractable slide type of device configured to provide mobility to said buffer cell relative to a supporting structure included in said at least one mobile trolley of said at least one buffer zone.

5. The method according to claim 4, wherein the step of insertion comprises the following steps:

taking out of said at least one mobile trolley from said at least one buffer zone;

insertion of at least one load to be loaded into at least one of said buffer cells of said at least one mobile trolley; and introduction of said at least one mobile trolley into said at least one buffer zone.

6. The method according to claim 4, comprising, for a recovery operation, the following successive steps:

moving of at least one load to be recovered, by said handling means, from said at least one storage zone to said at least one buffer zone; and retrieval of said at least one load to be recovered, out of said at least one buffer zone.

7. The method according to claim 6, wherein the step of retrieval comprises the following steps:

taking out of said at least one mobile trolley from said at least one buffer zone, via said at least one aperture;

retrieval of at least one load to be recovered out of the buffer cells of said at least one mobile trolley; and introduction of said at least one mobile trolley into said at least one buffer zone, via at least one aperture.

8. The method according to claim 4, wherein the method comprises, for combined operations of recovery and operations of loading, the following successive steps:

moving of at least one load to be recovered, by said handling means, from said at least one storage zone to said at least one of the buffer cells of said at least one mobile trolley positioned in said at least one buffer zone;

taking out of said at least one mobile trolley from said at least one buffer zone, via said at least one aperture;

retrieval of said at least one load to be recovered out of the buffer cells of said at least one mobile trolley;

insertion of at least one load to be loaded in at least one of said buffer cells of said at least one mobile trolley;

introduction of said at least one mobile trolley into said at least one buffer zone via said at least one aperture; and moving of said at least one load to be loaded, by said handling means, from said at least one buffer cell of said at least one mobile trolley to said at least one storage zone.

9. The method according to claim 4, wherein the method comprises, for actions carried out in parallel, the following successive steps:

during an insertion of at least one first load to be loaded and/or a recovery of at least one first load to be recovered in a first mobile trolley positioned outside said at least one buffer zone, said handling means move at least one second load to be recovered from said at least one storage zone to a second mobile trolley positioned in said at least one buffer zone and/or move at least one second load to be loaded from said second mobile trolley to said at least one storage zone;

via said at least one aperture, the second mobile trolley is taken out of said at least one buffer zone and the first mobile trolley is introduced into said at least one buffer zone;

during a recovery of said at least one second load to be recovered and/or an insertion of at least one third load to be loaded into the second mobile trolley positioned outside said at least one buffer zone, said handling means move said at least one first load to be loaded from the first mobile trolley, positioned in said at least one buffer zone, to said at least one storage zone and/or move at least one third load to be recovered from said at least one storage zone to the first mobile trolley, positioned in said at least one buffer zone.

* * * * *